US008560637B2

(12) United States Patent
Tsukada et al.

(10) Patent No.: US 8,560,637 B2
(45) Date of Patent: Oct. 15, 2013

(54) WEB APPLICATION SYSTEM, WEB SERVER, METHOD AND COMPUTER PRODUCT FOR DISPLAYING WEB APPLICATION MESSAGE

(75) Inventors: Naoki Tsukada, Kanazawa (JP); Haruo Higashiwaki, Kanazawa (JP); Kyoko Sawada, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 990 days.

(21) Appl. No.: 11/442,979

(22) Filed: May 31, 2006

(65) Prior Publication Data

US 2007/0192456 A1 Aug. 16, 2007

(30) Foreign Application Priority Data

Feb. 15, 2006 (JP) ................................ 2006-038487

(51) Int. Cl.
*G06F 15/16* (2006.01)
(52) U.S. Cl.
USPC ........... 709/219; 709/204; 709/205; 709/206; 709/207; 709/218; 709/217; 709/224; 707/607; 707/709; 707/710

(58) Field of Classification Search
None
See application file for complete search history.

(56) References Cited

U.S. PATENT DOCUMENTS

| | | | | |
|---|---|---|---|---|
| 6,138,150 A * | 10/2000 | Nichols et al. | ................ | 709/219 |
| 6,324,648 B1 * | 11/2001 | Grantges, Jr. | .................... | 726/12 |
| 6,457,063 B1 * | 9/2002 | Chintalapati et al. | ......... | 719/317 |
| 6,470,388 B1 * | 10/2002 | Niemi et al. | ................... | 709/224 |
| 6,489,968 B1 * | 12/2002 | Ortega et al. | .................. | 715/713 |
| 6,704,873 B1 * | 3/2004 | Underwood | ..................... | 726/12 |
| 7,065,556 B1 * | 6/2006 | Hickey et al. | .................. | 709/217 |
| 7,093,019 B1 * | 8/2006 | Bertani et al. | ................. | 709/229 |
| 7,107,307 B1 * | 9/2006 | Takishita | ....................... | 709/203 |
| 7,180,638 B1 * | 2/2007 | Hou et al. | ...................... | 358/439 |
| 7,209,817 B2 * | 4/2007 | Abdel-Malek et al. | .......... | 701/33 |
| 7,299,281 B1 * | 11/2007 | Wang et al. | .................... | 709/224 |
| 7,373,388 B2 * | 5/2008 | Leukert-Knapp et al. | ..... | 709/207 |
| 7,373,524 B2 * | 5/2008 | Motsinger et al. | ............ | 713/194 |
| 2001/0016872 A1 * | 8/2001 | Kusuda | ......................... | 709/205 |
| 2001/0054157 A1 * | 12/2001 | Fukumoto | ..................... | 713/201 |

(Continued)

FOREIGN PATENT DOCUMENTS

| | | |
|---|---|---|
| JP | 2000-10805 | 1/2000 |
| JP | 2002-288128 | 10/2002 |
| JP | 2003-140798 | 5/2003 |

OTHER PUBLICATIONS

Foldoc online dictionary of computing, definition of program dated back to Jul. 21, 2002.*

(Continued)

*Primary Examiner* — Ian N Moore
*Assistant Examiner* — Dung B Huynh
(74) *Attorney, Agent, or Firm* — Staas & Halsey LLP

(57) ABSTRACT

A web server is connected to a terminal computer capable of performing hypertext transfer protocol communications with the web server. The terminal computer includes a browser for displaying information. The web server executes a plurality of web applications upon receiving a request from the terminal computer. The web server transmits messages output by the applications being executed to the terminal computer. The terminal computer displays messages received from the web server collectively in one window of the browser.

13 Claims, 14 Drawing Sheets

(56) References Cited

U.S. PATENT DOCUMENTS

| | | | |
|---|---|---|---|
| 2004/0243617 A1* | 12/2004 | Bayyapu | 707/102 |
| 2005/0171661 A1* | 8/2005 | Abdel-Malek et al. | 701/33 |
| 2006/0015612 A1* | 1/2006 | Shimazaki et al. | 709/224 |
| 2006/0168211 A1* | 7/2006 | Koike | 709/225 |
| 2006/0267857 A1* | 11/2006 | Zhang et al. | 345/1.1 |
| 2006/0271695 A1* | 11/2006 | Lavian | 709/229 |

OTHER PUBLICATIONS

Foldoc dictionary, definition of application program, dated back to Jul. 21, 2002.*

Japanese Office Action for related Japanese Patent Application No. 2006-038487, mailed on Sep. 6, 2011.

Japanese Office Action mailed Jun. 5, 2012 issued in corresponding Japanese Patent Application No. 2006-038487.

* cited by examiner

FIG.7

| TIME | LOGIN USER NAME | WEB APPLICATION NAME | MESSAGE |
|---|---|---|---|
| 2006/3/18 13:22:01 | USER01 | | LOGS ON |
| 2006/3/18 14:21:05 | USER01 | HATTYUA | ORDER OPERATION A STARTS |
| 2006/3/18 14:22:01 | USER02 | | LOGS ON |
| 2006/3/18 14:22:24 | USER01 | HATTYUB | ORDER OPERATION B STARTS |
| 2006/3/18 14:23:28 | USER01 | HATTYUA | ORDER MASTER IS UPDATED (1 RECORD) |
| 2006/3/18 14:24:30 | USER01 | HATTYUA | ORDER SLIP IS OUTPUT (2 SHEETS) |
| 2006/3/18 14:24:55 | USER02 | HATTYUC | ORDER OPERATION C STARTS |
| 2006/3/18 14:25:10 | USER02 | HATTYUD | ORDER OPERATION D STARTS |
| 2006/3/18 14:25:30 | USER02 | HATTYUC | ORDER MASTER IS UPDATED (4 RECORDS) |
| 2006/3/18 14:26:45 | USER01 | HATTYUB | ORDER MASTER IS UPDATED (3 RECORDS) |
| 2006/3/18 15:24:30 | USER02 | HATTYUC | ORDER SLIP IS OUTPUT (3 SHEETS) |
| 2006/3/18 15:26:45 | USER02 | HATTYUD | ORDER MASTER IS UPDATED (2 RECORDS) |
| ... | ... | ... | ... |

FIG.8

| CURRENT LOGIN USER | INTER-PROCESS COMMUNICATION-MECHANNISM-UNIQUE-NAME | MESSAGE-TABLE-UNIQUE-NAME |
|---|---|---|
| USER01 | COM_USER01 | MESSAGE-TABLE_USER01 |
| USER02 | COM_USER02 | MESSAGE-TABLE_USER02 |

FIG.9A

MESSAGE-TABLE_USER01

| TIME | WEB APPLICATION NAME | MESSAGE |
|---|---|---|
| 2006/3/18 13:22:01 | | LOGS ON |
| 2006/3/18 14:21:05 | HATTYUA | ORDER OPERATION A STARTS |
| 2006/3/18 14:22:24 | HATTYUB | ORDER OPERATION B STARTS |
| 2006/3/18 14:23:28 | HATTYUA | ORDER MASTER IS UPDATED (1 RECORD) |
| 2006/3/18 14:24:30 | HATTYUA | ORDER SLIP IS OUTPUT (2 SHEETS) |
| 2006/3/18 14:26:45 | HATTYUB | ORDER MASTER IS UPDATED (3 RECORDS) |

FIG.9B

MESSAGE-TABLE_USER02

| TIME | WEB APPLICATION NAME | MESSAGE |
|---|---|---|
| 2006/3/18 14:23:01 | | LOGS ON |
| 2006/3/18 14:24:55 | HATTYUC | ORDER OPERATION C STARTS |
| 2006/3/18 14:25:10 | HATTYUD | ORDER OPERATION D STARTS |
| 2006/3/18 14:25:30 | HATTYUC | ORDER MASTER IS UPDATED (4 RECORD) |
| 2006/3/18 15:24:30 | HATTYUC | ORDER SLIP IS OUTPUT (3 SHEETS) |
| 2006/3/18 15:26:45 | HATTYUD | ORDER MASTER IS UPDATED (2 RECORDS) |

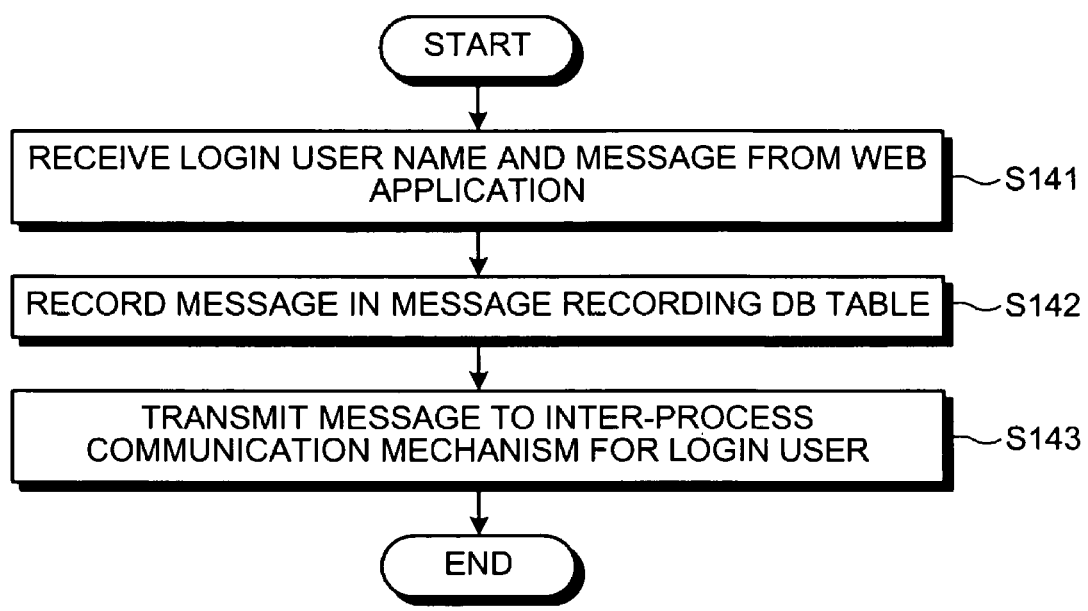

WEB APPLICATION SYSTEM, WEB SERVER, METHOD AND COMPUTER PRODUCT FOR DISPLAYING WEB APPLICATION MESSAGE

BACKGROUND OF THE INVENTION

1. Field of the Invention

The present invention generally relates to a technology for executing a plurality of web applications in a web server based on a request from a terminal computer, and specifically relates to displaying messages output from the web applications on a screen of the terminal computer.

2. Description of the Related Art

Computer systems have been known in which a console client is connected to an upper level computer and a command is sent from the console client to the upper level computer to execute an application at the upper level computer. The upper level computer can be a host computer, a workstation, a server or the like.

In such computer systems, it is possible that the console client causes the upper level computer to execute a plurality of applications. When a plurality of applications are to be executed, an operation window dedicated for each application is displayed on a screen of the console client, and an operator of the console client would perform some operation on the operation window to the cause the upper level computer to execute the corresponding application. Sometimes various messages are returned to the console client from the applications that are being executed at the upper level computer for the confirmation by the operator. In conventional computer systems, the messages returned from the applications are displayed in the operation window corresponding to that application. However, if a lot of operation windows are displayed on the screen of the console client and/or if some operation windows overlap on others, it is troublesome for the operator to check each operation window to check whether there is any new message.

To avoid such a trouble, Japanese Patent Publication No. 2000-10805, for example, discloses a method of consolidating messages output from all the applications being executed on a plurality of computer systems and displaying those messages in a single window on the console client that operates the applications. Because all the messages from all the application are displayed in one window, an operator can easily check whether there is any new message. The conventional technology represented by Japanese Patent Publication No. 2000-10805 aims at displaying messages output from an upper level computer on a lower level computer.

However, recently web services have been growing as the mainstream. A web system that offers a web service includes at least one web server and at least one client that can perform HTTP communication with the web server. Many applications are installed in the web server, and the web server also hosts a website that allows execution of the applications remotely. The client includes a browser, and an operator of the client accesses the website in the web server by using the browser and executes an application installed in the web server. When there are a plurality of web servers and a plurality of clients, user authentication is performed.

It is possible that the client causes the web server to execute a plurality of applications. When a plurality of applications are to be executed, a browser window dedicated for each application is displayed on a screen of the client, and the operator of the client would perform some operation on the operation window to the cause the web server to execute the corresponding application. Sometimes various messages are returned to the client from the applications that are being executed at the web server for the confirmation by the operator. The messages can be information indicative of status or result of execution of an application. In conventional web systems, the messages returned from the applications are displayed in the browser window corresponding to that application. However, if a lot of browser windows are displayed on the screen of the client and/or if some browser windows overlap on others, it is troublesome for the operator to check each browser window to check whether there is any new message.

SUMMARY OF THE INVENTION

It is an object of the present invention to at least partially solve the problems in the conventional technology.

According to an aspect of the present invention, a web application system comprising a web server and a terminal computer capable of performing hypertext transfer protocol communications with the web server, wherein the terminal computer includes a browser for displaying information. The web server includes an executing unit capable of executing a plurality of web applications upon receiving a request to that effect from the terminal computer; a message storing unit that stores therein messages output from each web application that is being executed by the executing unit in association with each application identification information for identifying each web application that is being executed; and a message transmitting unit that transmits the messages stored in the message storing unit to the terminal computer. The terminal computer includes a request sending unit that sends the request to the web server; a message receiving unit that receives the messages from the message transmitting unit; and a message displaying unit that displays messages received by the message receiving unit collectively in one window of the browser.

According to another aspect of the present invention, a web server in a web application system in which the web server and a terminal computer capable of performing hypertext transfer protocol communications with the web server. The terminal computer includes a browser for displaying information. The web server includes an executing unit capable of executing a plurality of web applications upon receiving a request to that effect from the terminal computer; a message storing unit that stores therein messages output from each web application that is being executed by the executing unit in association with each application identification information for identifying each web application that is being executed; and a message transmitting unit that transmits the messages stored in the message storing unit to the terminal computer.

According to still another aspect of the present invention, a web-application-message displaying method realized on a web server and a terminal computer capable of performing hypertext transfer protocol communications with the terminal computer, the terminal computer includes a browser for displaying information, includes the terminal computer sending a request to the web server to execute a plurality of web applications on the web server; the web server executing the web applications based on the request received from the terminal computer; the web server transmitting messages output from each web application that is being executed in association with each application identification information for identifying each web application to the terminal computer; and the terminal computer receiving the messages from the web server and displaying the messages collectively in one window of the browser.

According to still another aspect of the present invention, a computer-readable recording medium stores therein a computer program that realizes the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is an example of the contents of a message-storing DB table;

FIG. 8 is an example of the contents of a user-management table;

FIGS. 9A and 9B are examples of the contents of a message table;

FIG. 14 is a flowchart of a process to output data message.

DETAILED DESCRIPTION OF THE PREFERRED EMBODIMENTS

Exemplary embodiments of the present invention will be explained below in detail while referring to the accompanying drawings.

The following embodiment explains a method for collectively displaying messages by a web service on a local area network (LAN) connecting a web server to a plurality of browser terminals each including a client and a browser. It is assumed in the embodiment that an application server is integrated in the web server. However, the present invention is not limited by the embodiment, and the application server and the web server can be installed in separate computer systems.

Figure 1:
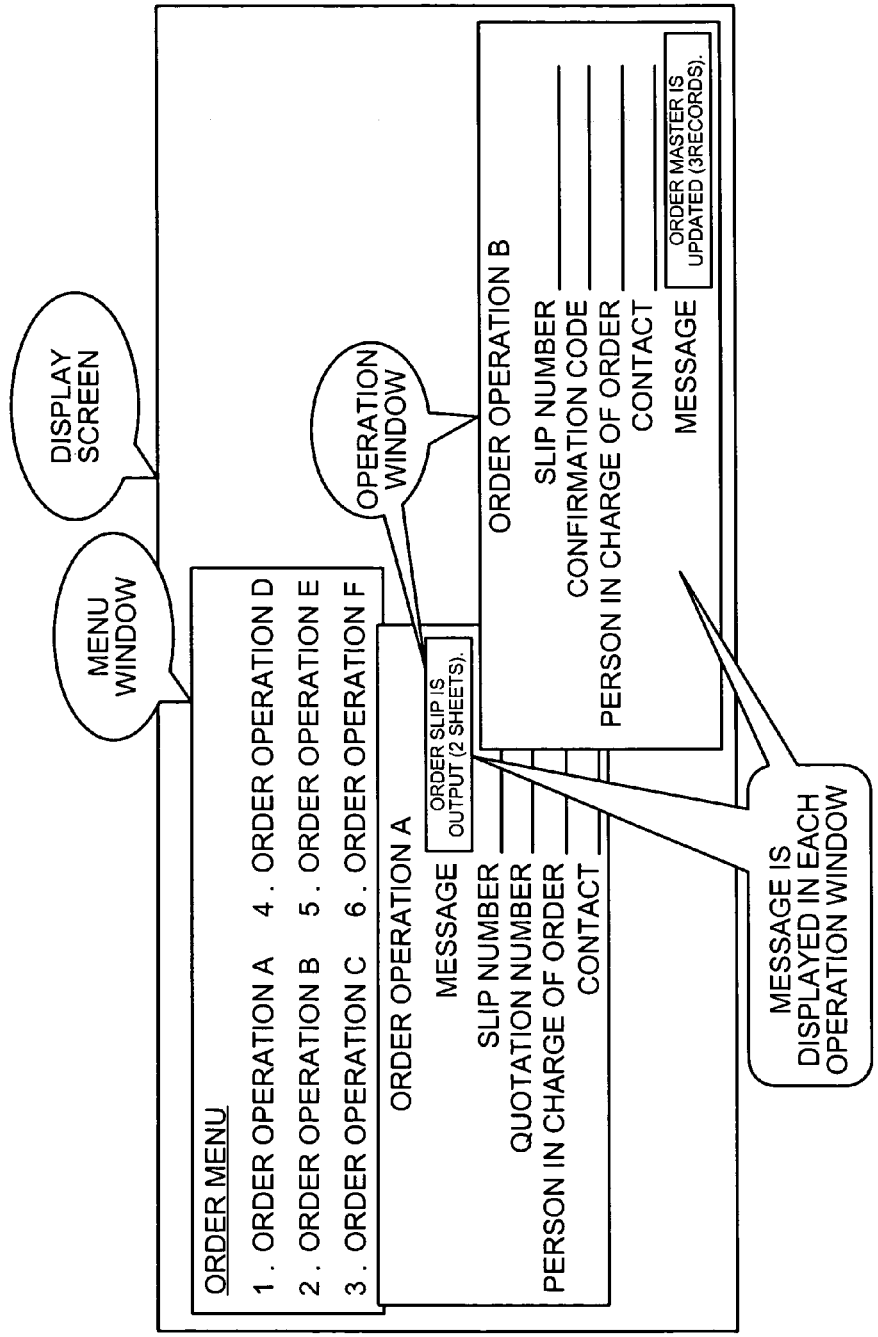
FIG. 1 is a schematic for explaining features of a conventional technology.
Figure 2:
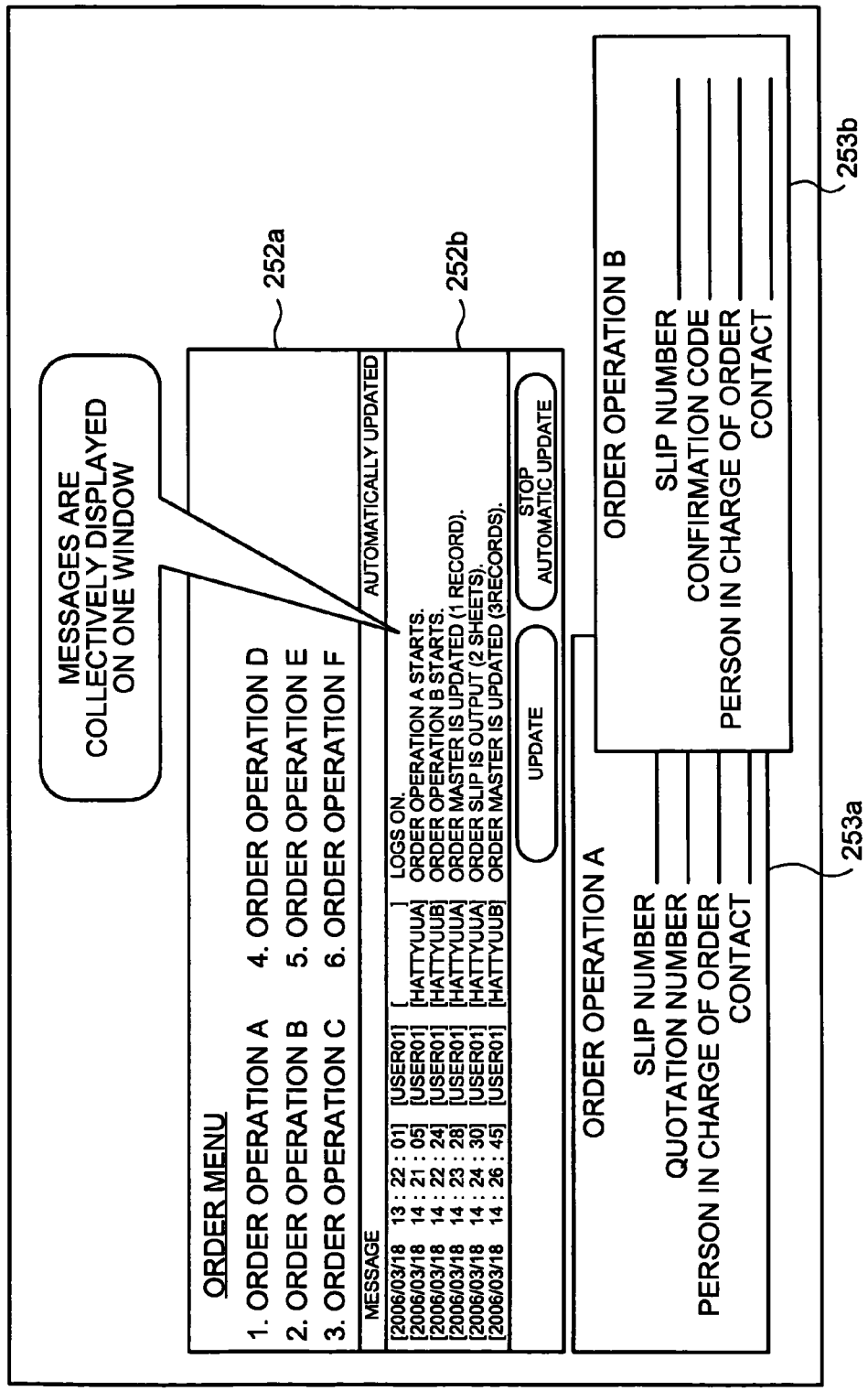
FIG. 2 is a schematic for explaining features of the present invention.

FIGS. 1 and 2 are schematics for comparing the features of the present invention with the features of a conventional technology. The conventional web application system displays, as shown in FIG. 1, independent operation windows each booted through the browser from a menu window displayed on a display screen of the browser terminal. Each of the operation windows is displayed independent from other operation windows and the menu window. Each of the operation window independently accepts an operation command and displays a message output from an application executed by the web server in response to the operation command on the corresponding operation window.

As described above, each operation window independently displayed with the conventional web application system is operated independently by the corresponding web application. At the execution of the web application, a message is output to the corresponding operation window. With the conventional web application system, because the message is output to each operation window, it is inconvenient to switch windows to check new messages on different windows when a command is given to a plurality of web applications executed on a browser.

On the contrary, the present invention allows messages output from the web applications executed by a single user to be collectively displayed on a single window, regardless of the operation window corresponding to the message. More specifically, as shown in FIG. 2, a message display window 252b is displayed accompanying a menu window 252a on the display screen. An order operation A window 253a and an order operation B window 253b are respectively displayed independently from the menu window 252a and the message display window 252b. Messages corresponding to the order operation A window 253a and the order operation B window 253b are collectively displayed in the message display window 252b.

The order operation A window 253a and the order operation B window 253b are displayed based on a display command from the menu window 252a. The message display window 252b is displayed with the menu window 252a because both the message display window 252b and the menu window 252a are displayed regardless of the executed operation. Integration of the two windows as a main window for displaying operation windows can achieve even higher operability and visibility on the screen. The improved visibility of the messages helps preventing oversight of a message.

The message display window 252b includes an update button enabling the user to direct the web application system to update the displayed messages. The message display window 252b further includes a function of automatically updating the messages at a predetermined time interval and a stop-automatic-update button to stop the automatic update.

Figure 3:
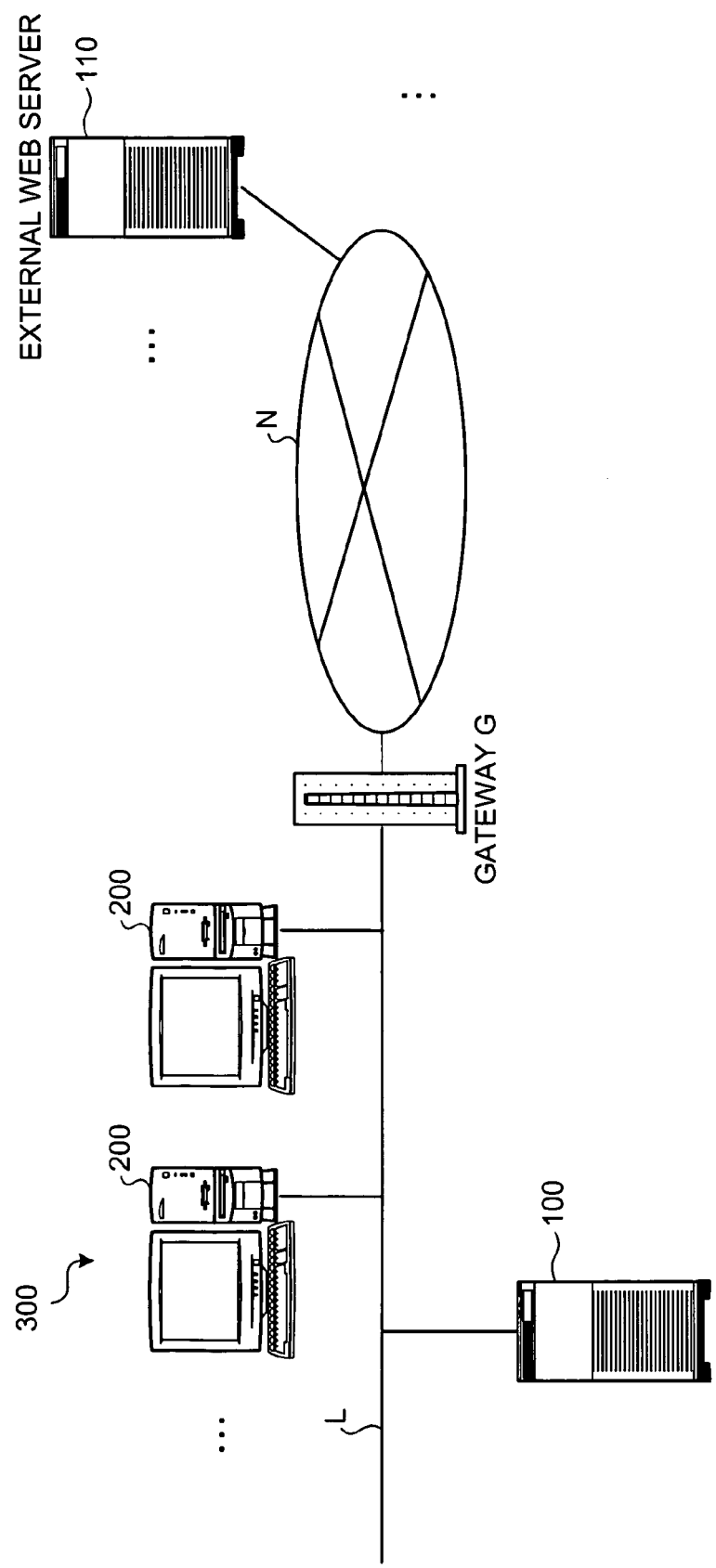
FIG. 3 is a schematic for explaining a configuration of a web application system according to an embodiment of the present invention.

FIG. 3 is a schematic of a web application system 300 according to an embodiment of the present invention. The web application system 300 includes a web server 100 and a plurality of browser terminals 200 connected one another through a local area network (LAN) L. The web server 100 is connected to each of the browser terminals 200 communicably by HTTP (including HTTPS and HTTPR). User authentication is performed when a user tries to login via the browser terminal 200, an when the user is an authentic user, he is allowed to boot an application on the web server 100 by using an operation display window displayed by the browser in the browser terminal 200. Applications specified by the plurality of browser terminals 200 can be booted on the web server 100 in the same manner. Namely, applications are booted on a web server by multiple users on a multi-task basis.

While only one web server 100 is shown in FIG. 2, there can be a plurality of web servers and applications can be booted on any of the web servers in response to an operation command from any of the browser terminals 200.

Moreover, while the web server and the browser terminals are shown to be connected via a local LAN L, they can be connected via the Internet. In other words, as shown in FIG. 2, if an external web server 110 is connected to the browser terminal 200 communicably via the HTTP communication using a network N such as the Internet, the external web server 110 can be used in the same manner as the web server 100. In this case, the LAN L is connected to the network N via a gateway G. It is needless to say that a web server can be connected to browser terminals via a metropolitan area network (MAN) or a wide area network (WAN).

Figure 4:
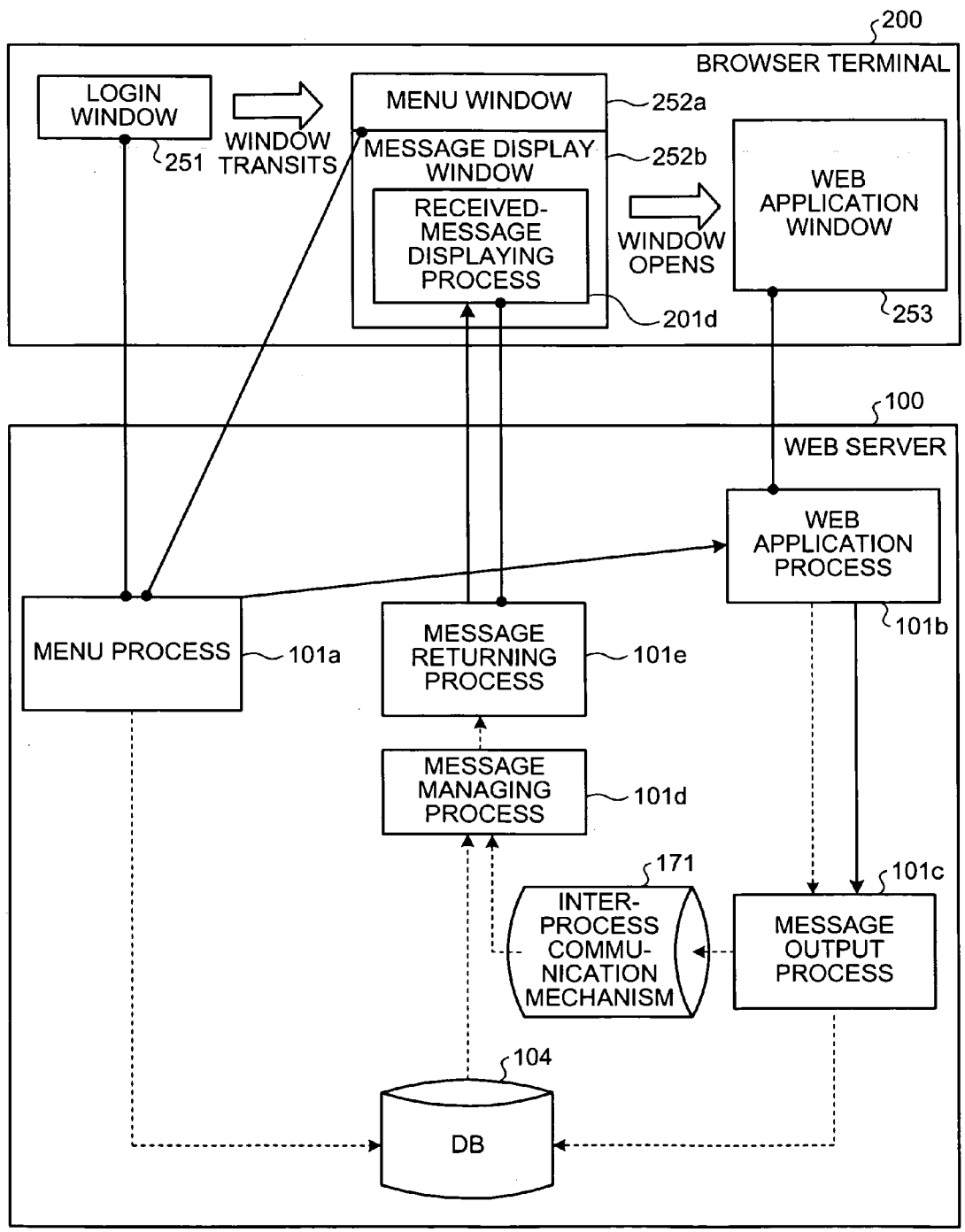
FIG. 4 is a schematic for explaining various processes in a browser terminal and a web server shown in FIG. 3 and how those processes are linked.

FIG. 4 is a schematic for explaining various processes in the browser terminal 200 and the web server 100 shown in FIG. 3 and how those processes are linked. At first, the browser terminal 200 displays a login window 251 using a browser. The user inputs login information including a user name (user ID) and a password from the login window to transmit the same via the HTTP communication to a menu process 101a executed on the web server 100. Upon receipt of correct login information, the menu process 101a transmits a window data corresponding to the menu window 252a to the browser terminal 200 via the HTTP communication and records the user name in a user-management table (not shown) in a database (DB) 104. When the user name is recorded, an inter-process communication mechanism unique name and a message table name are provided and recorded at the same time. When the browser terminal 200 receives the window data, the login window 251 changes into the menu window 252a on the browser. The menu window 252a includes a list of bootable web application names. Any of the web applications on the list can be specified.

Immediately after the user logs on, a message managing process 101d selectively acquires as many of the latest messages in the DB 104 as can be displayed in the message display window 252b to temporarily store in the message table. The message managing process 101d manages messages by selectively and temporarily storing the messages in this manner. The messages in the message table are transferred to a message returning process 101e, the message returning process 101e initiates a received-message displaying process 201d, and the received-message displaying process 201d initially displays the messages in the message display window 252b immediately after the login.

When a specification of a web application is input to the menu window 252a, a web application window 253 corresponding to the input opens. At the same time, the menu window 252a communicates with the menu process 101a via the HTTP communication to cause the menu process 101a to initiate a web application process 101b corresponding to the web application window 253. The web application window 253 and the web application process 101b communicate each other via the HTTP communication. Namely, the operation command to the web application input from the web application window 253 is transferred to the web application process 101b, and the web application process 101b executes a predetermined process upon receipt of the operation command.

Along with the predetermined process, or as a result of the predetermined process, the web application process 101b outputs various messages. Upon output of a message, the web application process 101b initiates a message output process 101c. The web application process 101b outputs a message to the message output process 101c. The message is accumulatively stored in the DB 104 by the message output process 101c, and transferred to an inter-process communication mechanism 171 having a unique name specified by the user management table. The message output process 101c is a subroutine initiated with respect to each web application process B.

Upon receipt of the message from the message output process 101c, the inter-process communication mechanism 171 transfers the message to the message managing process 101d. Upon receipt of the message from the inter-process communication mechanism 171, the message managing process 101d temporarily stores the received message in the message table along with the output time and the web application name. The message managing process 101d then deletes extra messages on a first-come-first-out basis so that the message table can always selectively store as many of the latest messages therein as can be displayed in the message display window 252b.

In the embodiment, it is assumed, but not limited to, that the web application process 101b, the message output process 101c, and the message managing process 101d are executed on the same web server 100. For example, it is allowable that the web application process 101b and the message output process 101c are executed on the same web server and the message managing process 101d is executed on another web server. In other words, the inter-process communication mechanism 171 can be capable of inter-process communication between different web servers 100. In such a case, the message output process 101c is supposed to transfer information that specifies the browser terminal such as an IP address and information that specifies the application such as a port number to the inter-process communication mechanism 171 along with the message.

Next, the message managing process 101d transfers the message to be stored in the message table to the message returning process 101e. Upon receipt of the message, the message returning process 101e initiates the received-message displaying process 201d on the browser terminal 200. The message returning process 101e then transfers a message to a user identified by the user name to have executed the web application to the received-message displaying process 201d via the HTTP communication. The received-message displaying process 201d displays the received message in the message display window 252b. Although the message managing process 101d and the message returning process 101e are actually integrated as a single module, the explanation is given assuming that they are separate processes based on the separate functions for better understanding. The received-message displaying process 201d includes an automatic message-update function for acquiring the latest messages from the message returning process 101e at the predetermined time interval. The received-message displaying process 201d further includes a manual message-updating function for acquiring the latest messages from the message returning process 101e in response to a command from the user.

To simplify the explanation, the explanation referencing FIG. 4 is given assuming that there is only one web application process 101b to be initiated by the menu process 101a. However, the present invention is not limited to the assumption but a plurality of web application processes 101b can be initiated. In such a case, a plurality of message output processes 101c are initiated corresponding to the number of the web application processes 101b, and each of the message output processes 101c transfers a message to the message managing process 101d using a corresponding inter-process communication mechanism 171.

Figure 5:
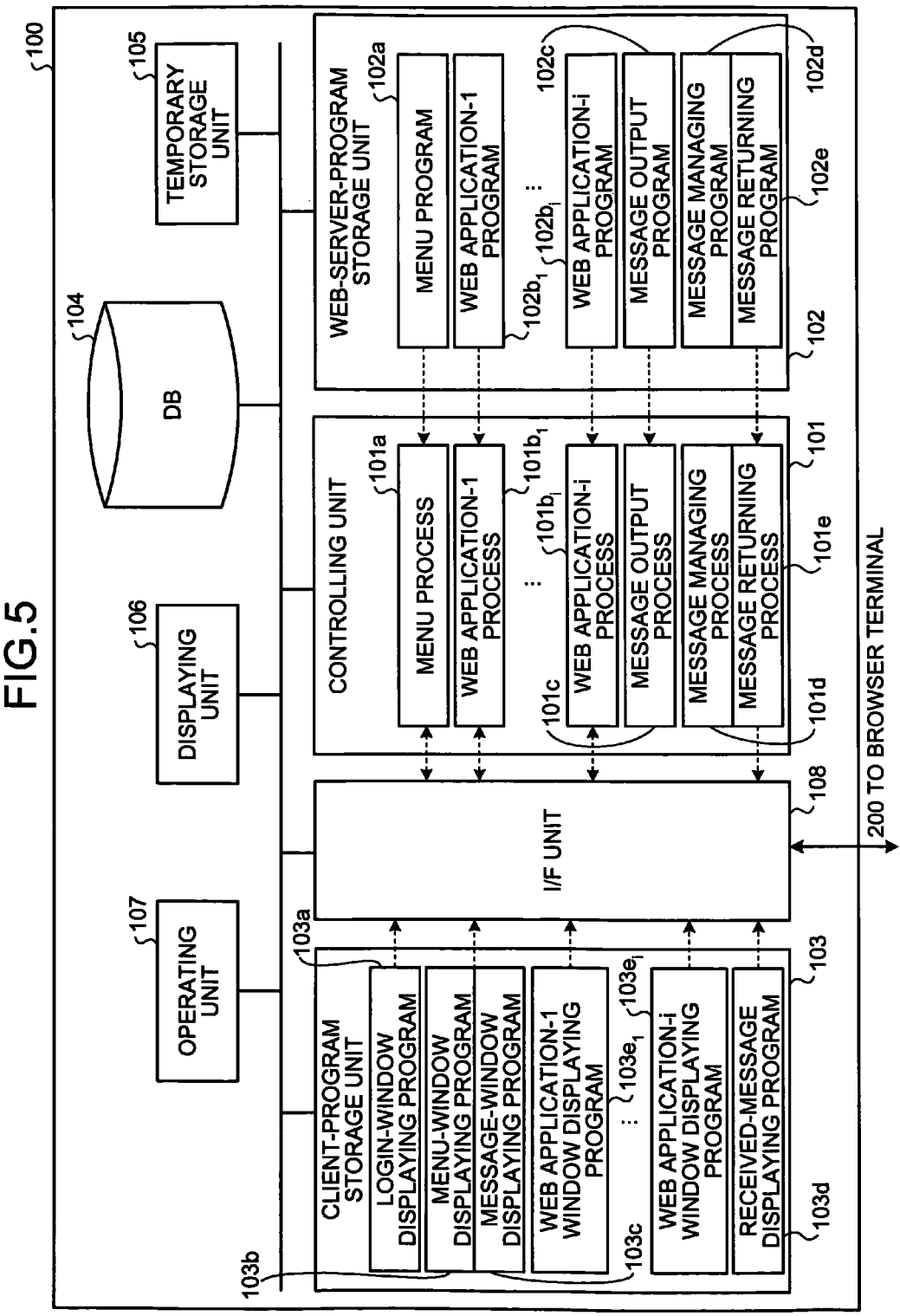
FIG. 5 is a detailed functional block diagram of the web server shown in FIG. 3.

FIG. 5 is a detailed functional block diagram of the web server 100. The web server 100 includes a controlling unit 101, a web-server-program storage unit 102, a client-program storage unit 103, the DB 104, a temporary storage unit 105, a displaying unit 106, an operating unit 107 that executes an input operation such as a keyboard or a mouse, and an I/F unit 108 that is an interface for transmitting and receiving data to and from the outside.

The displaying unit 106 is used to display information thereon. The operating unit 107 is used to input a command or data into the web server 100.

The controlling unit 101 controls the entire web server 100. In the controlling unit 101, the menu process 101a is produced and operated by execution of a menu program 102a stored in the web-server-program storage unit 102; a web application-i process $101b_i$ (where i is a positive integer above zero) is produced and operated by execution of a web application-i program $102b_i$; the message output process $101c$ is produced and operated by execution of a message output program $102c$; and the message managing process $101d$ and the message returning process $101e$ are produced and operated by execution of a message managing program $102d$ and a message returning program $102e$.

Although the message managing program $102d$ and the message returning program $102e$ are explained as separate programs here due to the different functions, the message managing program $102d$ and the message returning program $102e$ are actually integrated as a module. Similarly, the message managing process $101d$ and the message returning process $101e$ are actually integrated into one process. Each process transmits and receives a predetermined data to and from the outside via the I/F unit 108.

The web-server-program storage unit 102 is a nonvolatile storage unit such as a hard disk drive (HDD) or a read-only memory (ROM). The web-server-program storage unit 102 stores therein the menu program $102a$, the web application-i program $102b_i$, the message output program $102c$, the message managing program $102d$, and the message returning program $102e$. Each of the programs is a binary data readable and executable by the controlling unit 101.

The client-program storage unit 103 is also a nonvolatile storage unit such as an HDD or a ROM. The client-program storage unit 103 stores therein a login-window displaying program $103a$, a menu-window displaying program $103b$, a message-window displaying program $103c$, a web application-i window displaying program $103e_i$, and a received-message displaying program $103d$. Each of the programs is retrieved from the client-program storage unit 103 and transmitted to the browser terminal 200 via the I/F unit 108.

All of the programs except the received-message displaying program $103d$ are web-page window description data described in a description language. The received-message displaying program $103d$ is a binary data readable and executable by a controlling unit 201 in the browser terminal 200. Each of the programs is transmitted to the browser terminal 200 via the I/F unit 108. The menu-window displaying program $103b$ and the message-window displaying program $103c$ are shown as separate programs in the figure due to the functions thereof. In the embodiment, however, the menu window and the message window are supposed to be integrated into one window, and therefore the menu-window displaying program $103b$ and the message-window displaying program $103c$ are also supposed to be an integrated module.

The temporary storage unit 105 is a volatile storage unit such as a random access memory (RAM). The temporary storage unit 105 is used by the message managing process $101d$ to develop the message table. The message table stores therein the predetermined number of the latest messages to be displayed in the message display window $252b$ with respect to each user. The DB 104 stores therein the user-management table in which the menu process $101a$ stores login user information and a message-storing DB table in which the message output process $101c$ accumulatively stores messages. The user-management table can be stored in the temporary storage unit 105 instead. This is because the purpose of using the user-management table is management by the inter-process communication unique name rather than the user authentication, which can also be achieved by using the volatile storage.

Figure 6:
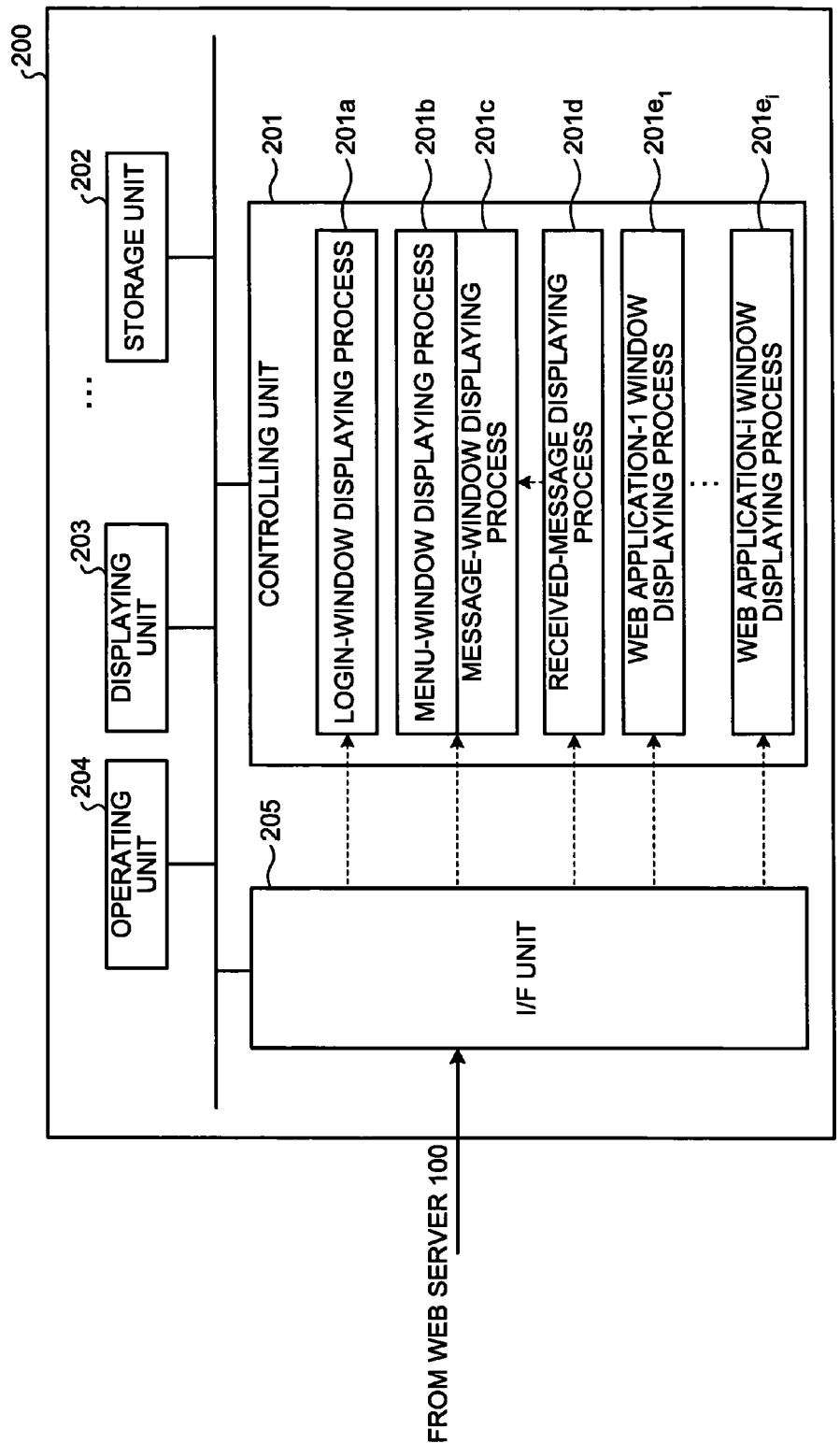
FIG. 6 is a detailed functional block diagram of the browser terminal shown in FIG. 3.

FIG. 6 is a detailed functional block diagram of the browser terminal 200. The browser terminal 200 includes the controlling unit 201, a storage unit 202 such as a RAM or an HDD, a displaying unit 203, an operating unit 204 such as a keyboard or a mouse that executes an input operation, and an I/F unit 205 that is an interface for transmitting and receiving data to and from the outside.

The storage unit 202 stores therein messages transmitted from the web server 100 and other data. The displaying unit 203 is used to display information thereon. The operating unit 204 is used to input a command or data into the browser terminal 200. The I/F unit 205 is used as an interface when communicating with the web server 100.

The controlling unit 201 controls the entire browser terminal 200. In the controlling unit 201, a login-window displaying process $201a$ is produced and operated by receipt and execution of the login-window displaying program $103a$ stored in the client program storing unit 103 in the web server 100 via the I/F unit 205; a menu-window displaying process $201b$ is produced and operated by receipt and execution of the menu-window displaying program $103b$; the received-message displaying process $201d$ is produced and operated by receipt and execution of the received-message displaying program $103d$; and a web application-i window displaying process $201e_i$ is produced and operated by receipt and execution of the web application-i window displaying program $103e_i$.

The menu-window displaying program $103b$ and the message-window displaying program $103c$ are integrated into a module, and therefore the menu-window displaying process $201b$ and the received-message displaying process $201d$ are also an integrated process. The menu-window displaying program $103b$ and the message-window displaying program $103c$ can be on separate modules, and therefore the menu-window displaying process $201b$ and the received-message displaying process $201d$ can be also separated into two processes.

FIG. 7 is an example of the contents of the message-storing DB table. The message-storing DB table stores therein all messages issued from the web application process in response to execution of the web application program in the web server 100. The message-storing DB table stores therein all the messages issued in the past.

The message-storing DB table includes the columns of time, login user name, web application name, and message. The time indicates the system time and date when the message is output. The login user name indicates the user that logged onto the web application S and commanded execution of the web application that issued the message. The web application name indicates the web application that output the message. When the user login is accepted by the menu process $101a$, the web application name is not indicated. The message indicates a message output from the web application. For example, the record on the second row of the table shown in FIG. 7 indicates that the login time is Mar. 18, 2006 14:21:05; the login user name is USER01; the web application name is HATTYUUA; and the message is ORDER OPERATION A STARTS.

The message-storing DB table records messages output from all the web applications in the web server in the order of time series, regardless of the login user or the web application.

FIG. 8 is an example of the contents of the user-management table. The user-management table records therein login information output from the menu process $101a$ in response to the user login to the web application system 300.

The user-management table includes the columns of current login user, inter-process communication mechanism unique name, and message table unique name. The current login user indicates the user that has logged onto the web application system 300, meaning that the user registered in this column is currently logged on the web application system 300.

The inter-process communication mechanism unique name is a name unique to the inter-process communication mechanism and the message table unique name is a name unique to the message table, both of which are determined by the menu process 101*a* according to the user login. Each of the inter-process communication mechanism and the message table can be distinguished from other users' inter-process communication mechanisms and message tables by the unique name. For example, the record on the top row of the table shown in FIG. 8 indicates that the current login user is USER01; the inter-process communication mechanism unique name is COM_USER01; and the message table unique name is MESSAGE-TABLE_USER01. The table indicates that two of USER01 and USER02 are currently logged on.

FIGS. 9A and 9B are examples of a message table developed in the temporary storage unit 105. Each table has a message table unique name specified in the user-management table. FIG. 9A is a message table named MESSAGE-TABLE_USER01 and FIG. 9B is another message table named MESSAGE-TABLE_USER02. Each message table includes data extracted from the message-storing DB table based on the user name corresponding to the message table unique name. The message table is allowed to have only a limited number of records due to restriction of displaying in the message display window 252*b*. Therefore, the predetermined number of the messages of a specific user having the latest time are extracted from the message-storing DB table to create the message table. For example, assuming that the number of records is limited to 100, one-hundred records with the latest time are extracted from among the messages to the specific user in the message-storing DB table to create the message table.

For example, FIG. 9A shows the result of extraction of the latest 100 records from among the records with the login user name USER01, and FIG. 9B shows the result of extraction of the latest 100 records from among the records with the login user name USER02.

Figure 10:
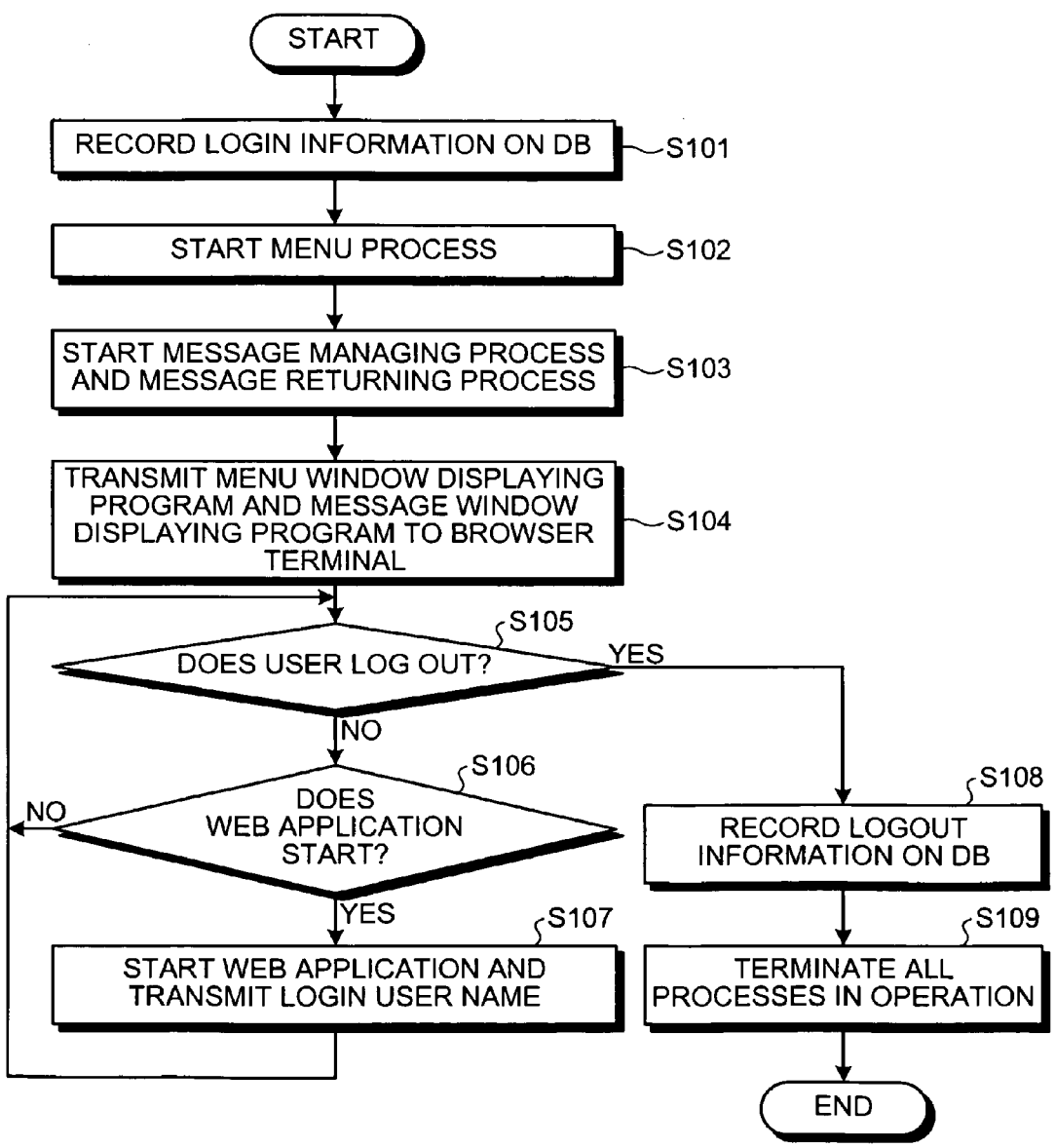
FIG. 10 is a flowchart of a login process performed after the user authentication is successful.

FIG. 10 is a flowchart of a login process performed in the web server 100 shown in FIG. 3 after the user authentication is successful. It is assumed here that the login-window displaying program 103*a* is transmitted to the browser terminal 200 and the login-window displaying process 201*a* is executed on the browser terminal 200 before the user authentication.

At first, when a correct login operation by a user of the browser terminal 200 is confirmed (login succeeds), the login information is recorded in the user management table in the DB 104 (step S101). Subsequently, the menu process 101*a* is initiated (step S102), and the message managing process 101*d* and the message returning process 101*e* are initiated (step S103). The menu-window displaying program 103*b* and the message-window displaying program 103*c* are transmitted to the browser terminal 200 (step S104).

It is then determined whether the user logs out (step S105). When the user logs out (YES at step S105), the process control is passed to the step S108, and when the user does not log out (NO at step S105), the process control is passed to the step S106. In the step S106, it is determined whether a boot of a web application is commanded. When the boot is commanded (YES at step S106), the web application is booted as specified at the step S106, and the login user name is transmitted to the web application process started by the initiation of the web application (step S107). When the boot of the web application is not commanded (NO at step S106), the process control is passed to the step S105.

In the step S108, the logout information is recorded in the user management table. This process can be achieved by setting a logout flag in the user management table or deleting the user name to log out from the user management table. The web server 100 then terminates all the processes (the menu process 101*a*, the web application i process, the message managing process 101*d*, and the message returning process 101*e*) (step S109).

Figure 11:
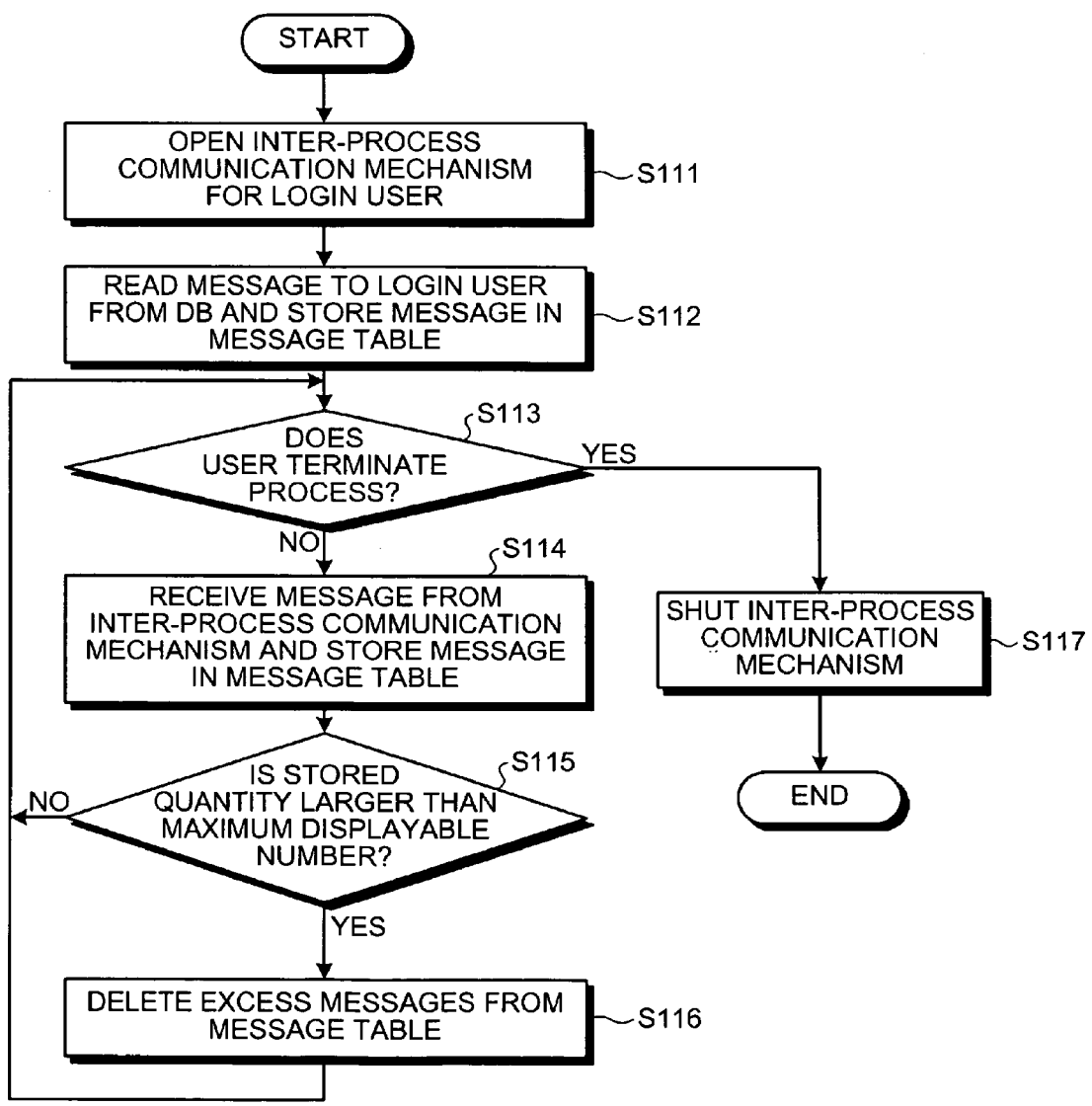
FIG. 11 is a flowchart of a process to manage messages.

FIG. 11 is a flowchart of a process to manage messages in the web server 100. The process is executed when the web application process 101*b* initiates the message output process 101*c*.

At first, the web server 100 opens the inter-process communication mechanism 171 with an inter-process communication unique name corresponding to the login user that initiated the web application process 101*b* (step S111). Subsequently, the web server 100 retrieves messages to the login user from the message-storing DB table, and accumulates the messages in the message table up to the maximum displayable number that is the largest number of the messages to be displayed in the message display window 252*b* (step S112). It is then determined whether the user terminates the process (step S113). When the user terminates the process (YES at step S113), the process control is passed to a step S117, and when the user does not terminate the process (NO at step S113), the process control is passed to a step S114. In the step S117, the inter-process communication mechanism 171 is closed at the same time as the termination of the web application process.

In the step S114, the messages received from the web application process 101*b* via the inter-process communication mechanism 171 are accumulated in the message table of the login user. Subsequently, it is determined whether the total number of the accumulated messages exceeds the maximum displayable number (step S115). When the total number of the messages exceeds the maximum displayable number (YES at step S115), the excessive number of the oldest messages are deleted from the message table (step S116). When the process terminates, the process control is passed to the step S113. When the total number of the messages does not exceed the maximum displayable number (No at step S115), the process control is passed to the step S113.

Figure 12:
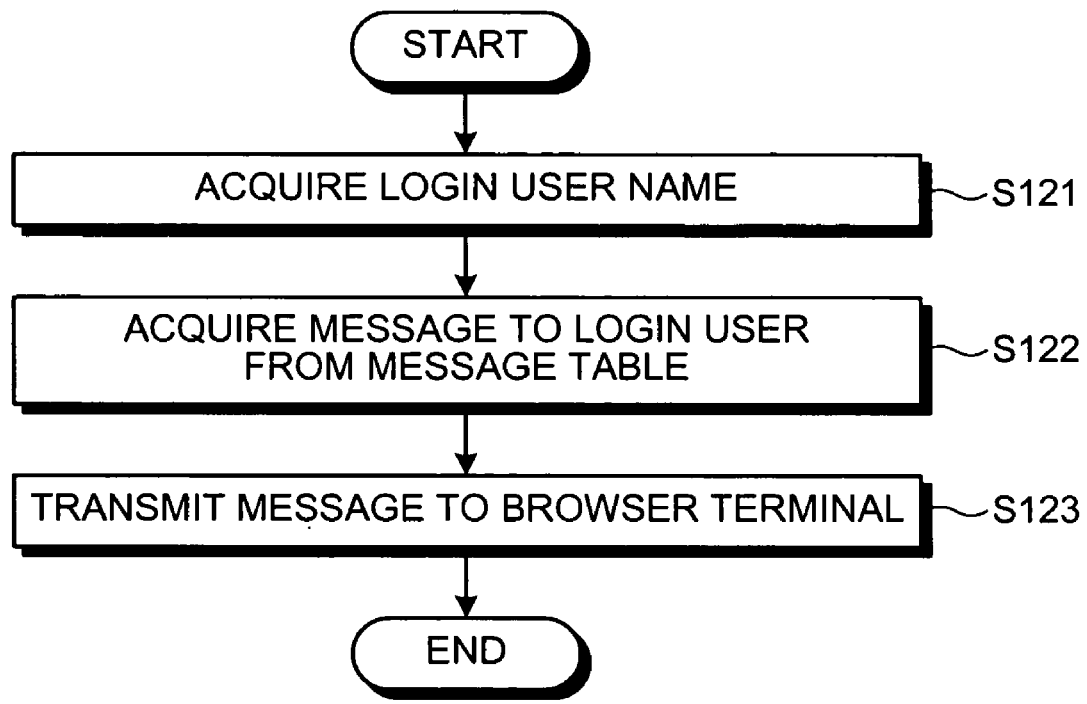
FIG. 12 is a flowchart of a process to transmit a message.

FIG. 12 is a flowchart of a process to transmit a message from the web server 100 to the browser terminal 200. It is assumed here that the message managing process 101*d* and the message returning process 101*e* are initiated prior to transmission of a message.

At first, the message returning process 101*e* acquires the login user name from the user management table (step S121). Subsequently, the message returning process 101*e* acquires the message of the login user from the message table (step S122), and transmits the acquired message to the browser terminal 200 of the login user (step S123).

In this manner, the message display window 252*b* in the browser terminal 200 can collectively display the messages to the login user regardless of the web application that output the message. This allows the user to easily check the messages from a plurality of web applications at a glance.

Figure 13:
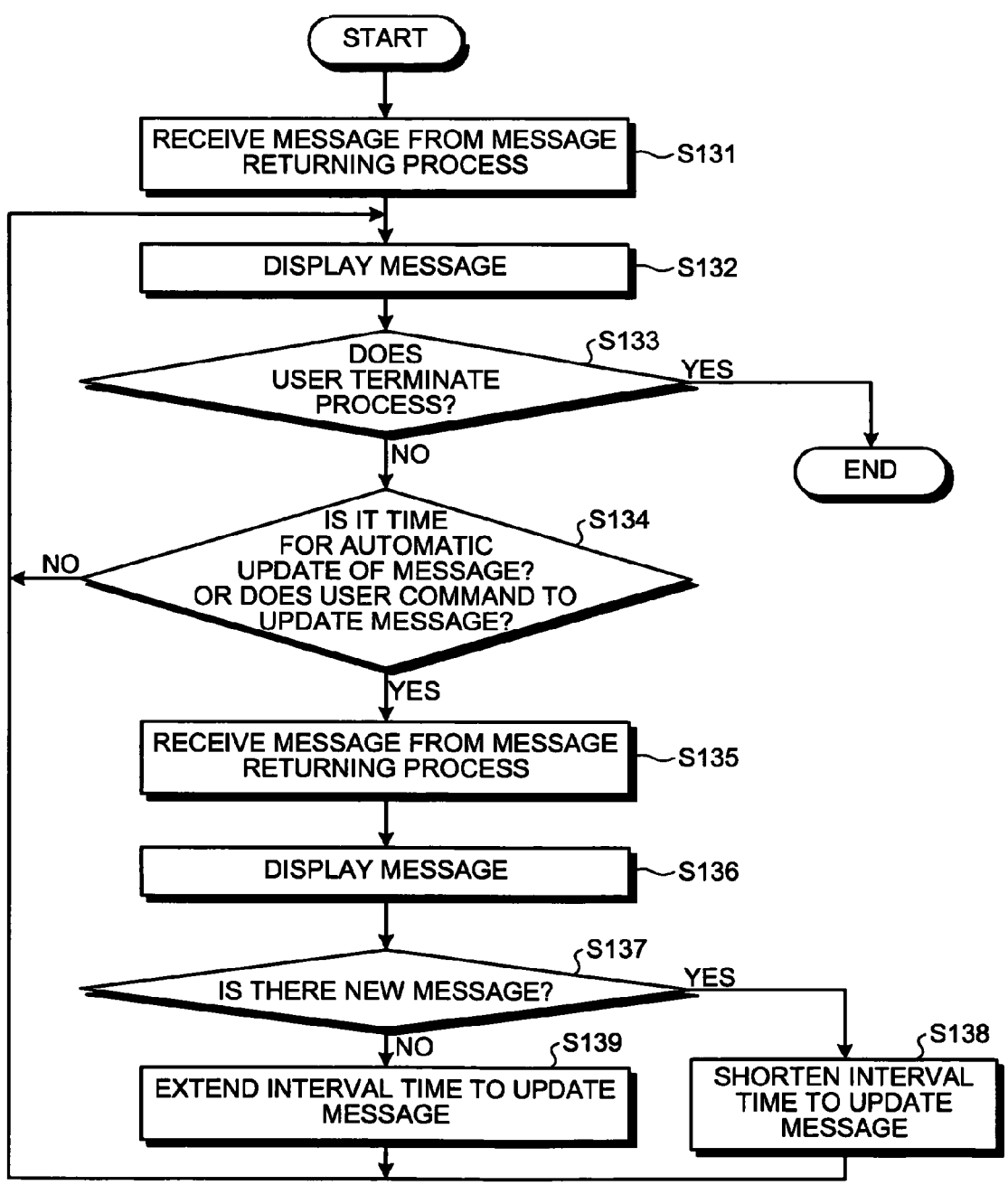
FIG. 13 is a flowchart of a process to display a message.

FIG. 13 is a flowchart of a process to display a message, which is received from the web server 100, in the browser terminal 200. It is assumed here that the received-message displaying process 201*d*, the menu-window displaying process 201*b*, and a message-window displaying process 201*c* are initiated prior to displaying a message.

At first, the browser terminal 200 receives the message from the message returning process 101e (step S131), and displays the message in the message display window 252b (step S132). Next, it is determined whether the user terminates the process (step S133). When the user terminates the process (YES at step S133), the browser terminal 200 terminates the process, but when the user does not terminate the process (No at step S133), the process control is passed to a step S134.

In the step S134, it is determined whether it is the timing for an automatic update of the message or whether the user commands the update of the message (step S134). When it is the timing for the automatic update or the user commands the update (YES at step S134), the browser terminal 200 receives a message from the message returning process 101e and displays the message in the message display window 252b (step S136). When it is not the timing for the automatic update and the user does not command the acquisition of the message (NO at step S134), the process control is passed to the step S133.

After the step S136, it is determined whether the message table has a new message (step S137). When the message table has a new message (YES at step S137), the time interval to update messages is reduced by a predetermined time (for example, 30 seconds) (step S138). When the message table does not have a new message (NO at step S137), the time interval to update the messages is extended by a predetermined time (for example, 30 seconds) (step S139).

In this manner, the time interval to update messages is controlled depending on whether the message table has a new message. This helps to prevent the increase of the processing load on the browser terminal 200 and the web server 100 and the increase of the network load on the web application due to vainly frequently executing the operation to update messages.

It is assumed in the embodiment, but not limited to, that the messages of only the login user are displayed at the steps S132 and S136. However, when the login user is a specific user such as a system administrator, messages of all users can be displayed.

FIG. 14 is a flowchart of a process to output a message in the web server 100. The process is executed when the message output process 101c receives a message from the web application process 101b. It is assumed here that the message output process 101c is initiated prior to the process.

At first, the message output process 101c receives a login user name and a message from the web application (step S141). Next, the message output process 101c records the message in the message-storing DB table (step S142), and transmits the message to the inter-process communication mechanism for the login user (step S143).

According to the embodiment, the following effects can be achieved:

Messages output from a plurality of web applications are displayed in a one window in the order of time series so that it becomes easy for the operator to check the messages.

The web application is booted after the login to the web application system 300, and the message output from the web application is transferred to the message managing process using the inter-process communication mechanism and displayed at last. This reduces the system load compared with the case of accessing the database at every message displaying process.

The past messages and the past login information are collectively displayed immediately after the user login by the user authentication. This helps the user to easily check the operations performed in the past and continue the work smoothly. This also allows the user to check whether anyone except the authentic user has logged on to the web application S to perform an operation, whereby the security can be improved.

Because the message display window 252b displays messages of only the login user, the message display is easy to see.

Because the mechanism to display a message output from a web application can be achieved by only booting a subroutine of the message output process 101c, web applications can be developed more efficiently.

According to an aspect of the present invention, it becomes possible for an operator to view the messages from a plurality of web applications without switching windows, resulting in improved convenience in checking the messages.

According to another aspect of the present invention, the message output unit is booted by a plurality of web applications, receives messages output from the web applications, transfers the received messages to a message managing unit using an inter-process communication mechanism, and records the messages in the message managing unit. The message output unit makes it possible to display both messages output in the past and in the nearest past promptly.

According to still another aspect of the present invention, messages to be managed by the message managing unit are selectively displayed from among the messages in the message storing unit. In this manner, only necessary messages can be displayed with a swift processing.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A web application system comprising a web server and a terminal computer capable of performing hypertext transfer protocol communications with the web server, wherein the terminal computer includes a browser for displaying information and is capable of being used by a plurality of users, wherein the web server includes
an executing unit that executes a plurality of web application programs, wherein the executing unit executes each of the web application programs upon receiving a request with user identification information for identifying a user who makes the request from the terminal computer;
a message storing unit that stores therein messages that each web application program being executed by the executing unit outputs independently of before, while or after each web application program responds to the terminal computer, wherein each of the messages shows respectively a status or result of each execution of the web application programs to the user who makes the request and the message storing unit stores the messages in association with each user identification information; and
a message transmitting unit that transmits, for each user identification information, the messages stored in the message storing unit to the terminal computer before, while or after each web application program responds to the terminal computer, and
the terminal computer includes
a request sending unit that sends the request and the user identification information for each of the web application programs to the web server;
a message receiving unit that receives the messages for each user identification information from the message transmitting unit before, while or after each web application program responds to the terminal computer; and a message displaying unit that displays messages received by the message receiving unit collectively in a separate window of the browser for each user identification information before, while or after each web application program responds to the terminal computer.

2. The web application system according to claim 1, wherein the web server further includes a message output unit that is booted by the web application programs, receives messages output from the web application programs, transfers received messages to the message storing unit using an inter-process communication mechanism, and records the received messages in the message storing unit.

3. The web application system according to claim 2, wherein the web server further includes
a determining unit that determines whether number of messages present in the message storing unit exceeds a predetermined number upon receipt of a new message from the message output unit; and
a message deleting unit that, when the determining unit determines that the number of the messages exceeds the predetermined number, deletes an oldest message from the message storing unit.

4. The web application system according to claim 1, further comprising a login accepting unit that accepts user login to the web application system and determines whether the user is an authentic user, and
the message transmitting unit transmits the messages stored in the message storing unit for a user that is determined to be authentic by the login accepting unit to the terminal computer.

5. The web application system according to claim 1, wherein the message displaying unit displays the messages in an order of time series.

6. The web application system according to claim 1, wherein
the web server further includes a setting unit that sets a cycle at which the message transmitting unit is to transmit the messages from the message storing unit to the terminal computer, and
the setting unit includes
a cycle-extending unit that extends the cycle by a predetermined time period if a new message is not stored in the message storing unit during the cycle; and
a cycle-shortening unit that shortens the cycle by the predetermined time period if a new message is stored in the message storing unit during the cycle.

7. A web server in a web application system in which the web server and a terminal computer capable of performing hypertext transfer protocol communications with the web server, wherein the terminal computer includes a browser for displaying information and is capable of being used by a plurality of users, wherein the web server includes
an executing unit that executes a plurality of web application programs, wherein the executing unit executes each of the web application programs upon receiving a request with user identification information for identifying a user who makes the request from the terminal computer;
a message storing unit that stores therein messages that each web application program being executed by the executing unit outputs independently of before, while or after each web application program responds to the terminal computer, wherein each of the messages shows respectively a status or result of each execution of the web application programs to the user who makes the request and the message storing unit stores the messages in association with each user identification information; and
a message transmitting unit that transmits, for each user identification information, the messages stored in the message storing unit to the terminal computer before, while or after each web application program responds to the terminal computer, wherein the messages are received for each user identification information and displayed collectively in a separate window of the browser for each user identification information before, while or after each web application program responds to the terminal computer by the terminal computer.

8. The web server according to claim 7, further comprising a message output unit that is booted by the web application programs, receives messages output from the web application programs, transfers received messages to the message storing unit using an inter-process communication mechanism, and records the received messages in the message storing unit.

9. The web server according to claim 8, further comprising:
a determining unit that determines whether number of messages present in the message storing unit exceeds a predetermined number upon receipt of a new message from the message output unit; and
a message deleting unit that, when the determining unit determines that the number of the messages exceeds the predetermined number, deletes an oldest message from the message storing unit.

10. A computer-readable, non-transitory medium that stores therein a computer program that realizes a web-application-message displaying method on a web server and a terminal computer capable of performing hypertext transfer protocol communications with the terminal computer, the terminal computer includes a browser for displaying information and is capable of being used by a plurality of users, the computer program causing the computer to execute:
the terminal computer sending a plurality of requests each of which is with user identification information for identifying a user who makes one of the requests to the web server to execute a plurality of web application programs on the web server;
the web server executing the web application programs based on the requests received from the terminal computer;
the web server transmitting messages that each web application program being executed outputs independently of before, while or after each web application program responds to the terminal computer, to the terminal computer, wherein each of the messages shows respectively a status or result of each execution of the web application programs to the user who makes the request and the transmitting transmits the messages for each user identification information; and
the terminal computer receiving the messages for each user identification information from the web server before, while or after each web application program responds to the terminal computer and displaying the messages collectively in a separate window of the browser for each user identification information.

11. A web-application-message displaying method realized on a web server and a terminal computer capable of performing hypertext transfer protocol communications with the terminal computer, the terminal computer includes a browser for displaying information and is capable of being used by a plurality of users, the web application message displaying method comprising:

sending, by the terminal computer, a plurality of requests each of which is with user identification information for identifying a user who makes one of the requests to the web server to execute a plurality of web application programs on the web server;

executing, by the web server, the web application programs based on the requests received from the terminal computer;

transmitting, by the web server, messages that each web application program being executed outputs independently of before, while or after each web application program responds to the terminal computer, to the terminal computer, wherein each of the messages shows respectively a status or result of each execution of the web application programs to the user who makes the request and the transmitting transmits the messages for each user identification information; and receiving, by the terminal computer, the messages for each user identification information from the web server before, while or after each web application program responds to the terminal computer and displaying the messages collectively in a separate window of the browser for each user identification information, wherein the plurality of requests are associated respectively with a plurality of users and a separate display window is provided for each user.

12. The web application message displaying method according to claim 11, further comprising receiving, by the web server, the messages output from each web application program and causing a message storing unit to store received messages using an inter-process communication mechanism before transmitting the messages to the terminal computer.

13. The web application message displaying method according to claim 11, further comprising accepting, by the web server, user login and determining whether the user is an authentic user, and the transmitting includes transmitting the messages for a user that is determined to be authentic at the accepting to the terminal computer.

* * * * *

UNITED STATES PATENT AND TRADEMARK OFFICE
CERTIFICATE OF CORRECTION

| | | |
|---|---|---|
| PATENT NO. | : 8,560,637 B2 | Page 1 of 1 |
| APPLICATION NO. | : 11/442979 | |
| DATED | : October 15, 2013 | |
| INVENTOR(S) | : Naoki Tsukada et al. | |

It is certified that error appears in the above-identified patent and that said Letters Patent is hereby corrected as shown below:

In the Claims

In Column 14, Lines 51-52, In Claim 10, delete "to the terminal computer, to the terminal computer," and insert -- to the terminal computer, --, therefor.
In Column 15, Lines 14-15, In Claim 11, delete "to the terminal computer, to the terminal computer," and insert -- to the terminal computer, --, therefor.

Signed and Sealed this
Fifteenth Day of September, 2015

Michelle K. Lee
*Director of the United States Patent and Trademark Office*